United States Patent
Cho (10) Patent No.: US 8,243,888 B2
(45) Date of Patent: Aug. 14, 2012

(54) APPARATUS AND METHOD FOR MANAGING CALL DETAILS USING SPEECH RECOGNITION

(75) Inventor: Seung-Hwan Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1815 days.

(21) Appl. No.: 11/253,830

(22) Filed: Oct. 19, 2005

(65) Prior Publication Data

US 2006/0093099 A1    May 4, 2006

(30) Foreign Application Priority Data

Oct. 29, 2004    (KR) ........................ 10-2004-0087029

(51) Int. Cl.
*H04M 1/64* (2006.01)
*H04M 3/42* (2006.01)

(52) U.S. Cl. ................ 379/88.01; 379/88.22; 455/414.1

(58) Field of Classification Search ................ 379/88.13, 379/88.01, 88.22; 455/414.1
See application file for complete search history.

(56) References Cited

U.S. PATENT DOCUMENTS

| | | | | |
|---|---|---|---|---|
| 6,064,963 | A * | 5/2000 | Gainsboro | 704/270 |
| 6,278,772 | B1 * | 8/2001 | Bowater et al. | 379/88.13 |
| 6,792,082 | B1 * | 9/2004 | Levine | 379/67.1 |
| 6,895,257 | B2 * | 5/2005 | Boman et al. | 455/556.1 |
| 6,973,428 | B2 * | 12/2005 | Boguraev et al. | 704/251 |
| 7,072,684 | B2 * | 7/2006 | Gusler et al. | 455/550.1 |
| 7,076,427 | B2 * | 7/2006 | Scarano et al. | 704/270 |
| 7,133,831 | B2 * | 11/2006 | Brown et al. | 704/275 |
| 7,478,044 | B2 * | 1/2009 | Kirkland et al. | 704/235 |
| 7,483,832 | B2 * | 1/2009 | Tischer | 704/260 |
| 7,489,767 | B2 * | 2/2009 | Hikishima | 379/88.14 |
| 7,502,448 | B1 * | 3/2009 | Elman et al. | 379/68 |
| 7,539,086 | B2 * | 5/2009 | Jaroker | 369/25.01 |
| 7,937,268 | B2 * | 5/2011 | Kirkland et al. | 704/235 |
| 2002/0073207 | A1 * | 6/2002 | Widger et al. | 709/227 |
| 2006/0004683 | A1 * | 1/2006 | Talbot et al. | 706/59 |
| 2006/0293888 | A1 * | 12/2006 | Jindal | 704/235 |

* cited by examiner

*Primary Examiner* — Joseph T Phan
(74) *Attorney, Agent, or Firm* — The Farrell Law Firm, P.C.

(57) ABSTRACT

A method and apparatus for managing call details using speech recognition are provided. To manage call details, incoming and outgoing voice signals during a call are converted into their written equivalent by speech recognition technology. The details of the call, including the conversation, are stored in text form so that a user can search for them when needed. Accordingly, the user can easily retrieve what was spoken during calls and systematically manage desired information by searching or sorting the call details.

12 Claims, 8 Drawing Sheets

APPARATUS AND METHOD FOR MANAGING CALL DETAILS USING SPEECH RECOGNITION

PRIORITY

This application claims priority under 35 U.S.C. §119 to an application entitled "Apparatus and Method for Managing Call Details Using Speech Recognition" filed in the Korean Intellectual Property Office on Oct. 29, 2004 and assigned Serial No. 2004-87029, the contents of which are incorporated herein by reference.

BACKGROUND OF THE INVENTION

1. Field of the Invention

The present invention relates generally to an apparatus and method for recording call conversations using speech recognition, and in particular, to an apparatus and method for recognizing words spoken during a conversation through a terminal, writing the spoken words on a screen, recording the written words, and managing them.

2. Description of the Related Art

The huge increase in number of mobile phone users over the past years has triggered a variety of services including basic voice call, text and voice message transmission, wireless Internet service for providing information, and positioning service.

As mobile phones have become a necessity for daily living, mobile phones are used to keep in touch or to make appointments with their friends or family members. That is, various pieces of information are exchanged through the mobile phones. Often, a user needs to write down something important during a call, e.g., a customer's order from phone call to deliver food or a product in business.

Traditionally, however, communication is just conducted during a call and there is no other way but to write down some necessary information on a stationary after the call is over. To overcome this problem, some mobile phones have been equipped with the function of recording a call conversation such that a user presses a predetermined button for call record. However, this conventional recording of voice signals during a call occupies a large memory space and is very difficult to search for important information.

Additionally, as mobile phones have been developed to provide various services and execute various functions along with their proliferation, their screen size and colors in number are increasing. Along with the trend, there is a strong need for utilizing the screen space more efficiently in many ways. Therefore, it is necessary to incorporate the screen in the function of managing a call conversation in the mobile phone in order to increase the utilization of the screen and satisfy user demands.

As described above, because a call conversation is stored by recording voice signals during a call in the conventional technology, it is impossible to selectively record a part of the conversation. Therefore, the entire conversation is recorded and the intended part is listened for during retrieval, or the intended part is recorded by user manipulation during the call.

Another shortcoming with the conventional method is that there is no way to store the call conversation graphically, i.e., without the need for writing notes down or transcribing the conversation at a later time, or manage and search the stored conversation. Even worse, it is impossible to forward the stored conversation to another person.

SUMMARY OF THE INVENTION

Therefore, an object of the present invention is to substantially solve at least the above problems and/or disadvantages and to provide at least the advantages below.

Accordingly, an object of the present invention is to provide a speech recognition-based call details managing apparatus and method for recognizing words spoken during a call, converting the spoken words into their written equivalent, displaying the converted words on a screen, storing the converted words when the call is over, and thus facilitating management of the call conversation, in order to increase the utilization of the screen in a mobile phone.

Another object of the present invention is to provide a speech recognition-based call details managing apparatus and method that enables a user to search for intended call details using a conditional search function, sorting the call details in a predetermined order, and displaying them in a mobile phone in which call conversations are recorded in the form of text by speech recognition.

The above objects are achieved by providing a method and apparatus for managing call details using speech recognition.

According to one aspect of the present invention, in an apparatus for managing call details using speech recognition, an audio processor detects incoming and outgoing voice signals representing a call conversation during a call and converts the voice signals into text. A memory stores call details including the text of the call conversation. A controller generates the call details including the text of the call conversation, stores the call details when the call is completed, searches for call details according to a search condition received from a user, and displays the searched call details.

According to another aspect of the present invention, in a method of managing call details using speech recognition, incoming and outgoing voice signals representing a call conversation during a call are detected and converted into text. Call details including the text of the call conversation are generated and stored. A call details search item is received from a user and data is received from the user as a search condition in relation to the selected search item. Call details are searched for according to the search condition and displayed.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail since they would obscure the invention in unnecessary detail.

The present invention is intended to provide functions for managing call details. Accordingly, the present invention utilizes speech recognition technology in which incoming and outgoing voice signals during a call are turned into their written equivalent. Also, the details of the call including the conversation are stored in text so that a user can search for them when needed. Therefore, the user can easily ascertain what was spoken during calls and systematically manage desired information by searching or sorting the call details.

As described above, the present invention uses the speech recognition technology to convert words spoken during a call into their written equivalents. However, before describing the present invention, it is noted that in the present application, speech recognition is the process of extracting features from a given voice signal and tracking down the underlying string of phonemes, which are represented as the voice signal, by a pattern recognition algorithm.

Figure 1:
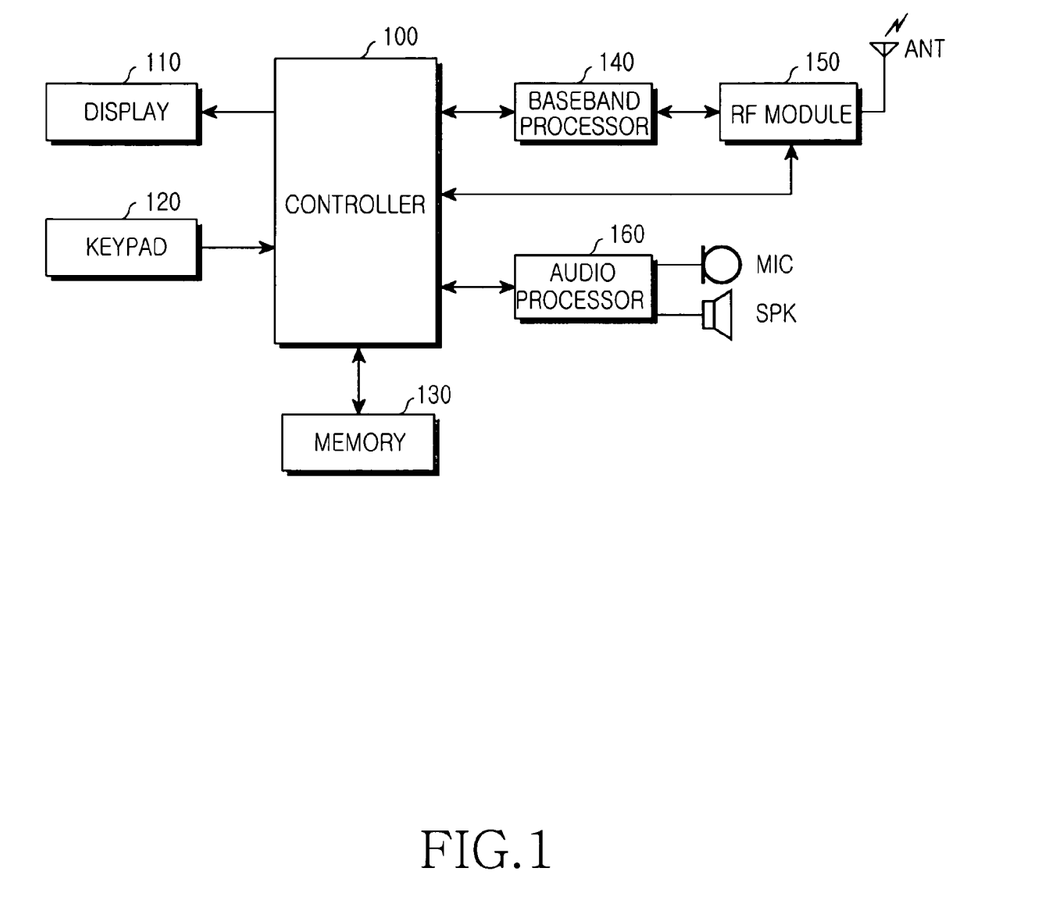
FIG. 1 is a block diagram illustrating a mobile phone for managing call details according to an embodiment of the present invention.

FIG. 1 is a block diagram of a mobile phone for managing call details according to the present invention. Referring to FIG. 1, a controller 100 provides overall control to the mobile phone, including conducting wireless calls and processing data. As will described later, the controller 100 generates call details, including the recorded actual call conversations, by converting incoming and outgoing voice signals involved in the calls into text. Additionally, the controller stores the converted signals in a memory 130, along with updating call details stored in the memory 130 according to an embodiment of the present invention.

Additionally, the controller 100 is capable of managing the various call details. That is, the controller 100 controls each component so that a voice signal is converted into text and thus the details of the call are stored in the form of text. The call details include the actual call conversation, call time, and caller number of the call.

A display 110 displays key input data received from a keypad 120 or displays the operational state of the mobile phone and information in icons or text under the control of the controller 100. Also, the display 110 graphically notifies a user of the current state in relation to user setting or activation of a function under the control of the controller 100. According to an embodiment of the present invention, the display 110 displays the written conversions of the words spoken during a call thereon in real time.

The keypad 120, including digit keys and function keys, provides data corresponding to key input from the user to the controller 100. That is, the keypad 120 outputs data corresponding to a key pressed by the user to the controller 100 which correspondingly operates.

The memory 130 is connected to the controller 100 and includes, for example, a read only memory (ROM) and a random access memory (RAM) for storing programs and information required to control the operation of the mobile phone. According to the embodiment of the present invention, the memory 130 stores/updates call details under the control of the controller 100.

A radio frequency (RF) module 150 transmits and receives RF signals to and from a base station through an antenna (ANT). The RF module 150 downconverts the received RF signal to an intermediate frequency (IF) signal and outputs it to a baseband processor 140. The RF module 150 upconverts an IF signal received form the baseband processor 140 to an RF signal for transmission.

The baseband processor 140 is a baseband analog ASIC (BAA) for interfacing between the controller 100 and the RF module 150. The baseband processor 140 converts a digital baseband signal received from the controller 100 to an analog IF signal and provides it to the RF module 150. The baseband processor 140 also converts an analog IF signal received from the RF module 150 to a digital baseband signal and provides it to the controller 100.

An audio processor 160 is connected to the controller 100, a microphone (MIC), and a speaker (SPK). The audio processor 160 converts a voice signal received from the MIC into data at a call connection and provides it to the controller 100. The audio processor 160 also converts voice data received from the controller 100 into an audible sound and outputs it through the SPK. The audio processor 160 recognizes at least one of incoming and outgoing voice signals and converts the recognized signal into text according to the embodiment of the present invention. For example, a voice signal received through the MIC and a voice signal to be output through the SPK are converted into their written equivalents by the audio processor 160.

The text from the audio processor 160 can be displayed on the display 110 in real time. For example, incoming and outgoing voice signals are written in real time on a dialog window as in a messenger when the user converses through an earpiece connected to the mobile phone configured to have an increased utilization of a display. The conversion of spoken words into text in the audio processor 160 is implemented by appropriately applying known speech recognition means to the present invention.

Figure 2:
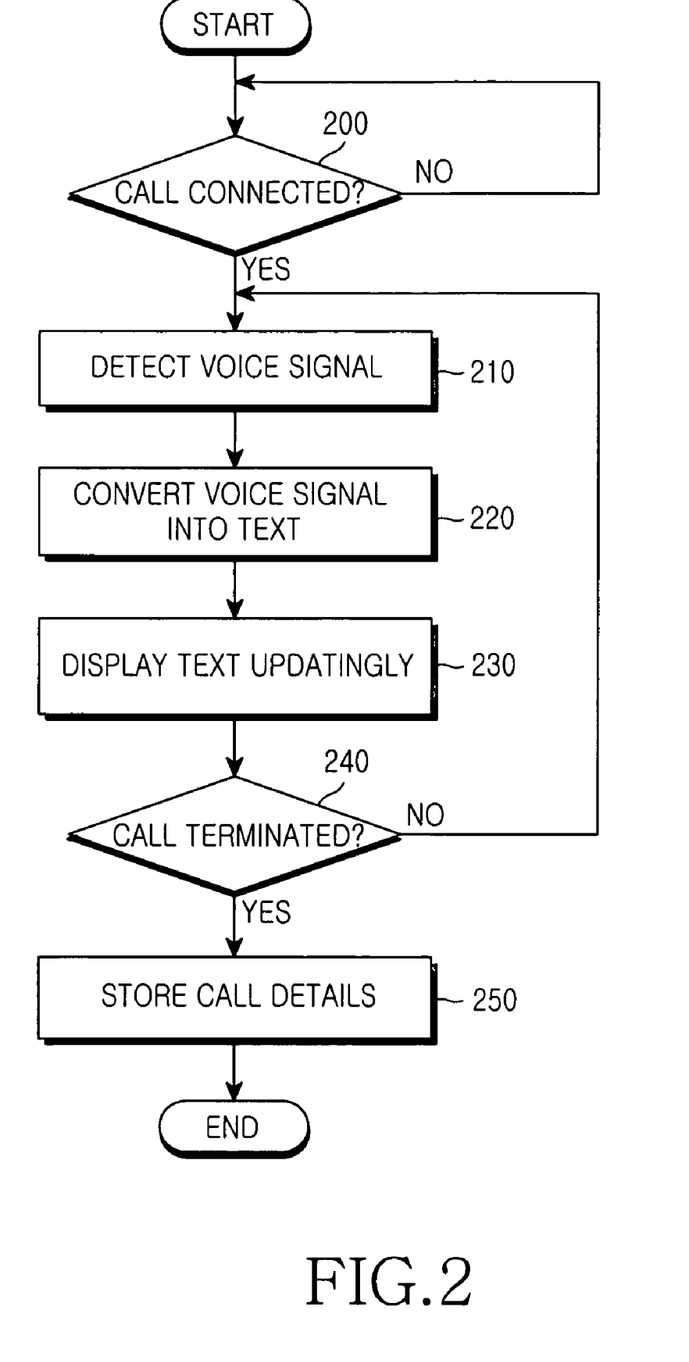
FIG. 2 is a flowchart illustrating a control operation for storing details of a call during the call according to an embodiment of the present invention.

FIG. 2 is a flowchart illustrating a control operation for storing details of a call during the call according to an embodiment of the present invention. Referring to FIG. 2, the controller 100 determines if key input corresponding to call connection has been received for a call origination/termination in step 200. Upon receipt of the call connection key input, the controller 100 detects incoming and outgoing voice signals during the call in step 210 and controls conversion of the voice signals into text in step 220. In step 230, the controller 100 controls the text of the call conversation to be updated and displayed. That is, the controller 100 displays the call conversation in real time on the display 110, for example, on a messenger dialog window of the display 110, as illustrated in FIG. 3.

Figure 3:
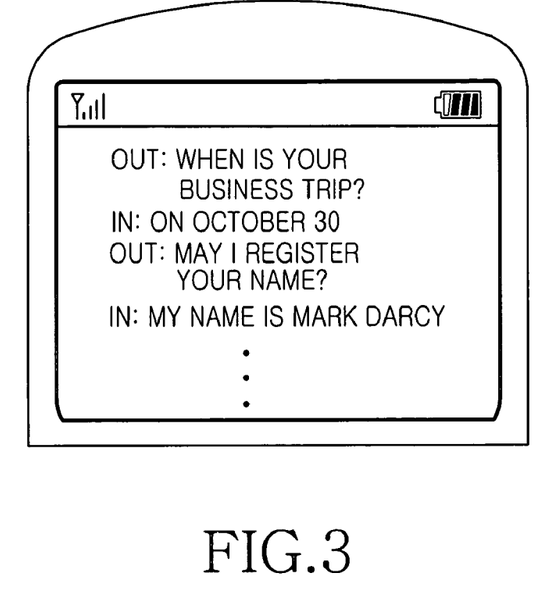
FIG. 3 illustrates an exemplary display of written equivalents of incoming and outgoing voice signals during a call according to an embodiment of the present invention.

FIG. 3 exemplarily illustrates spoken words during a call written in text on a screen according to the embodiment of the present invention. The screen space can be utilized more efficiently and in various ways by configuring the function of displaying a picture or image in a predetermined position of the dialog window.

During the call, the controller 100 determines if a key input corresponding to call termination has been received in step 240. If the call is on going, the controller 100 returns to step 200 to repeat the above-described procedure. If the call is terminated, the controller 100 stores call details relevant to the call, including the conversation written on the dialog window and the call time and caller information of the call in step 250, as illustrated in FIG. 4.

Figure 4:
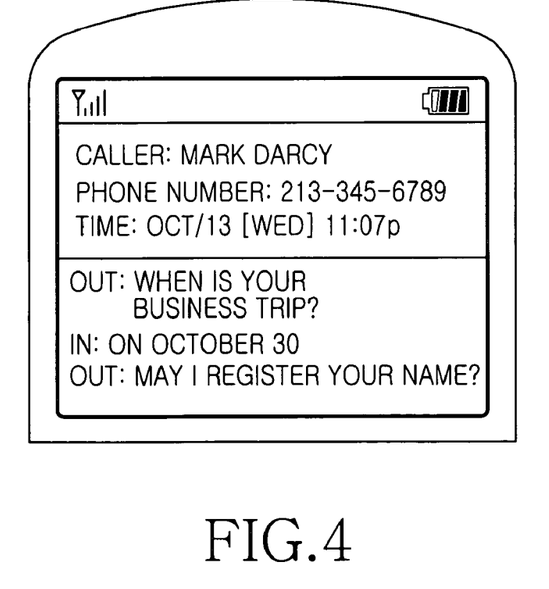
FIG. 4 illustrates an exemplary display of call details stored after a call is terminated according to an embodiment of the present invention.

Referring to FIG. 4, the call details are composed of caller information including a caller name and a caller number, a call time, and a conversation.

As described above, words spoken during a call can be converted into their written equivalent and stored according to the present invention.

Herein below, with reference to FIG. 5, a description will be made of a method of providing call details including a conversation written in text to other users through searching, sorting, or data processing to different forms.

Figure 5:
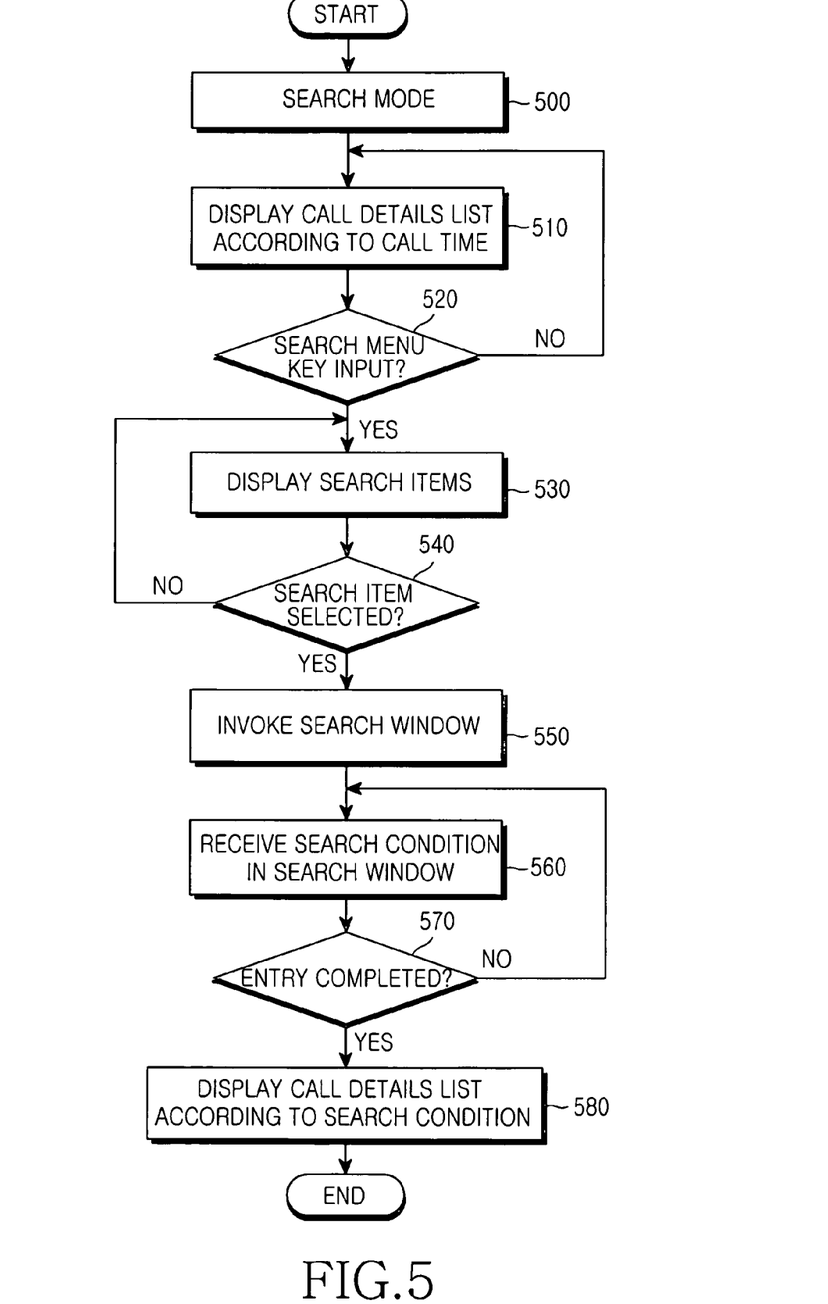
FIG. 5 is a flowchart illustrating a control operation for searching for call details according to an embodiment of the present invention.

FIG. 5 is a flowchart illustrating a control operation for searching for call details according to an embodiment of the present invention. Referring to FIG. 5, the controller 100 transitions the mobile phone to a call details search mode, for example, upon receiving a key input requesting a call details search from the user in step 500. Thereafter, the controller 100 displays a call details list on the display 110 in step 510. When the user wants to review previous conversations, the conversations are preferably arranged in the order of the latest to the earliest according to their call end times in the call details list. More specifically, call details stored in the memory 130 are retrieved according to their call end times on the display 110 under the control of the controller 100.

In this state, the user can select a search menu that provides a conditional search according to an embodiment of the present invention. That is, in addition to displaying the call details list according to call end time, a search menu by which to search for intended call details in the call details list is further provided according to the embodiment of the present invention.

Figure 7A:
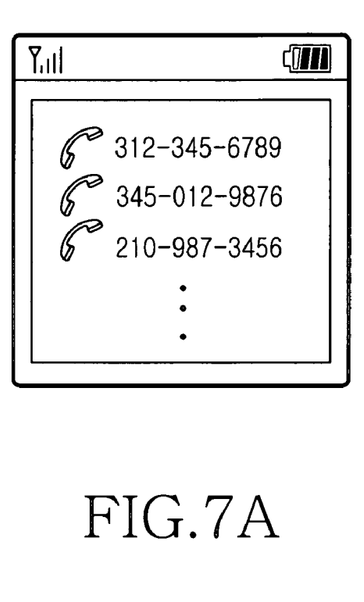
FIGS. 7A and 7B illustrate an exemplary display of search items under which to search for call details according to an embodiment of the present invention.

Accordingly, the controller 100 determines if a key input requesting a call detail search has been received from the user in step 520. In the absence of the search key input, the controller 100 keeps the call details list displayed in step 510. The call details list may be displayed as illustrated in FIG. 7A. However, upon receiving the search key input, the controller 530 displays search items in step 530.

The search items may include conditional search items. For example, the search items may include Caller Name, Caller Number, Conversation, and Sort by Caller.

The controller 100 determines if the user has selected one of the search items in step 540. Upon user selection of a search item, the controller 100 displays a pop-up search window corresponding to the selected search item in step 550 and receives a user-set search condition through the search window in step 560.

In step 570, the controller 100 determines if the search condition has been completely entered. If it has, the controller 100 searches for call details in the memory 130 according to the search condition and displays a list of the detected call details in step 580.

Figure 6:
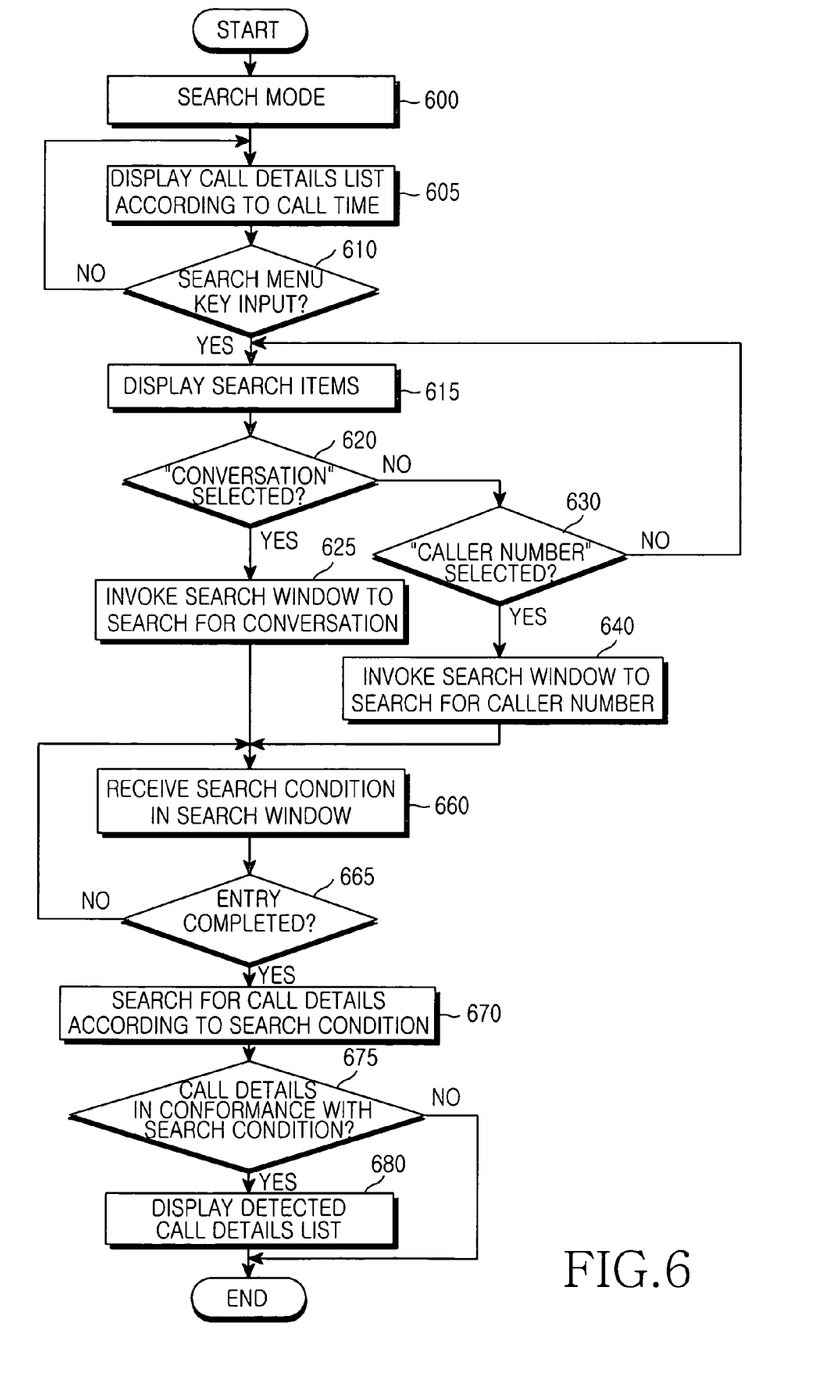
FIG. 6 is a flowchart illustrating a control operation for searching for call details under specific search items according to an embodiment of the present invention.
Figure 7B:
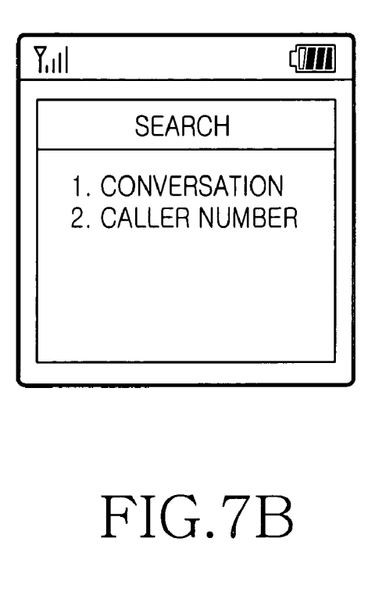

In FIG. 6, the above operation will be described in more detail, taking specific search items "Conversation" and "Caller Number" as examples according to the embodiment of the present invention. Referring to FIG. 6, the controller 100 transitions to a call details search mode in step 600 and displays a call details list having call details arranged in the order of their call end times in step 605. Thereafter, a search menu can be displayed as illustrated in FIG. 7B.

In step 610, the controller 100 determines if a key input corresponding to the search menu has been received. Upon receipt of a key input, the controller 100 displays search items under the search menu as illustrated in FIG. 7B, in step 615. The search menu may include search items "Conversation" and "Caller Number" as illustrated in FIG. 7B.

Figure 8A:
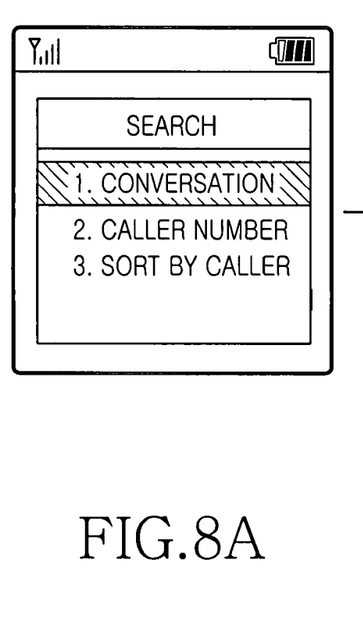
FIGS. 8A, 8B, and 8C illustrate an exemplary pop-up window that is displayed upon selection of Conversation as a search item and an exemplary display of call details in conformance with a search condition according to an embodiment of the present invention.
Figure 8B:
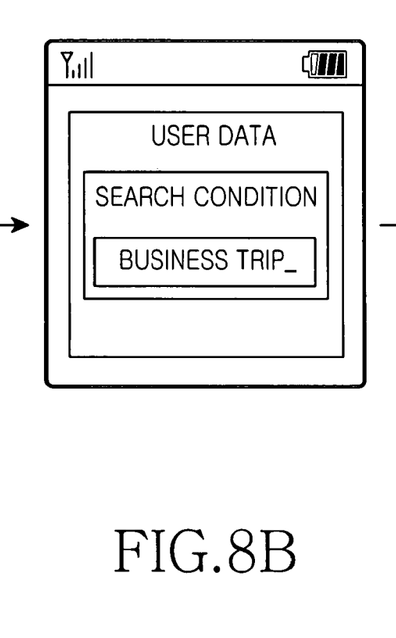
Figure 8C:
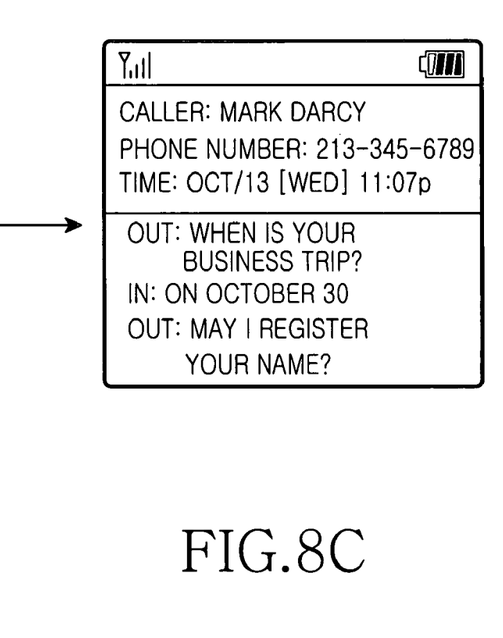

In step 620, the controller 100 then determines if the user has selected "Conversation". If the user has selected "Conversation" as illustrated in FIG. 8A, the controller 100 displays a pop-up search window as illustrated in FIG. 8B in step 625.

However, if the user has selected "Caller Number" in step 630, the controller 100 displays a pop-up search window corresponding to the search item in step 640.

After "Conversation" or "Caller Number" is selected, the controller 100 receives a specific search condition from the user through the search window in step 660. For "Conversation", the user may enter a part of a call conversation, for example, a keyword in the search window. For "Caller Number", the user may enter the whole or part of a caller number in the search window.

In step 665, the controller 100 determines if the condition entry has been completed. If it has, the controller 100 searches the memory 130 for call details in conformance with the search condition in step 670. While "Conversation" and "Caller Number" have been described as search items by way of example, "Call Time", "Caller Name", etc., may be further included as search items.

When the user selects a search item and wants to search for call details including an intended keyword, he enters the keyword to specify the search condition. The mobile phone then searches for the call details and displays them.

In step 675, the controller 100 determines if there are call details corresponding to the search condition. In the presence of such call details, the controller 100 arranges them in a predetermined order and displays them in step 680. For example, the call details can be arranged in an order of call end time, in an alphabetical order regarding the first alphabets of call details, or in an order of caller numbers. If the user enters a keyword or a caller number as a search condition, preferably, the searched call details are arranged in the above-described order.

The process of searching for, arranging and displaying call details has been described above. Additionally, a sorting function may be further provided as a method of facilitating management of call details. For example, if the user selects a sort condition under a conditional sort menu, call details are arranged in conformance with the selected sort item, without the need of manually entering a word or digits as a search condition by the user. The sort conditions may include "Call End Time", "Caller", "Caller Group", and "Caller Number".

Figure 9A:
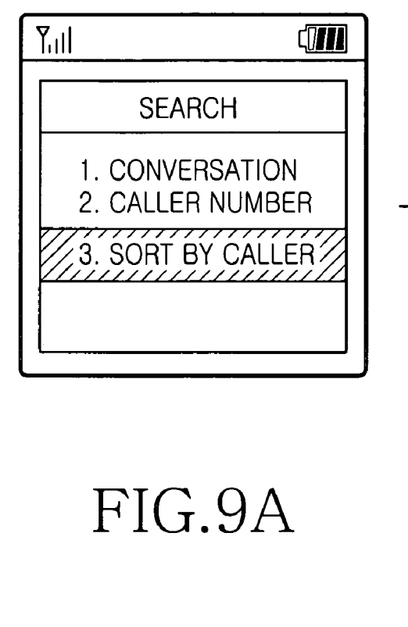
FIGS. 9A and 9B illustrate an exemplary display of call details sorted in conformance with Sort by Caller according to an embodiment of the present invention.
Figure 9B:
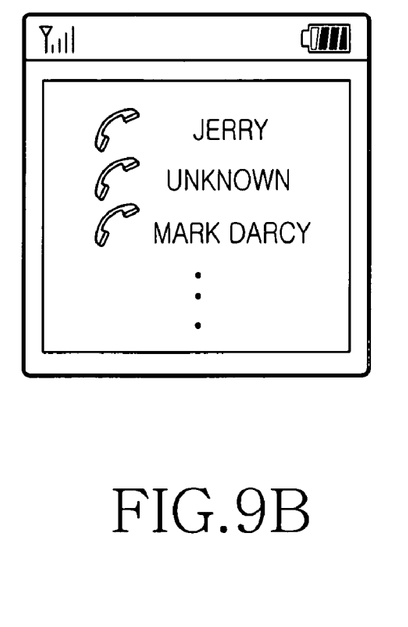

If "Caller" is selected as a sort condition as illustrated in FIG. 9A, caller names are listed in an alphabetical order on the display.

As described above, the speech recognition-based call details managing apparatus and method of the present invention stores words spoken during a call in their written equivalent in the memory 130. When a user enters a keyword using a search function that searches for call details and displays them in a list, call details including the keyword are searched or sorted, thereby facilitating the user to retrieve intended information and systematically manage call details. Also, call details can be sorted by caller, caller group, call time, or caller number.

Besides the call details search and sorting functions, call details information including actual conversations are generated and stored in the form of database files that can be transferred to other media or in the form suited for e-mail transmission.

Compared to the conventional technology that requires the user to rely on his memory in order to ascertain calling parties or called parties with which he conversed and what was spoken during calls, the present invention relieves the user of the constraint of memorizing or writing down something relevant to a call. Also, storing the spoken words in written text enables a large volume of call details to be stored.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A mobile phone for managing call details using speech recognition, comprising:
    an audio processor for detecting incoming and outgoing voice signals of a call conversation and converting the voice signals into text;
    a memory for storing call details including the text of the call conversation; and
    a controller for generating the call details including the text of the call conversation, storing the call details in the memory of the mobile phone when the call conversation is completed, searching for call details according to a search condition received from a user, and controlling for displaying the searched call details; and
    a display for displaying a search window for searching for the call details and displaying the search call details.

2. The mobile phone of claim 1, wherein the search window is displayed as a pop-up window in which the user enters at least a part of a search keyword to search for intended call details.

3. The mobile phone of claim 1, wherein the call details include at least one of the call conversation, a call time, a caller name, and a caller number.

4. The mobile phone of claim 1, wherein the search condition is one of call conversation, call time, caller number, and caller name.

5. The mobile phone of claim 1, wherein if a number of the searched call details is at least one, the controller sequentially arranges the searched call details in a predetermined order.

6. A method of managing call details using speech recognition in a mobile phone, comprising the steps of:
    detecting incoming and outgoing voice signals during a call conversation and converting the voice signals into text;
    generating call details including the text of the call conversation and storing the call details in a memory of the mobile terminal;
    receiving a call details search item selected by a user;
    receiving data as a search condition in relation to the selected search item;
    searching for call details corresponding to the search condition; and
    displaying any corresponding call details.

7. The method of claim 6, wherein the search condition is one of call conversation, call time, caller number, and caller name.

8. The method of claim 6, wherein the call details include at least one of the call conversation, a call time, a caller name, and a caller number.

9. The method of claim 6, wherein the step of receiving the data as the search condition comprises the steps of:
    displaying a search window according to the selected search item; and
    receiving the search condition in the search window from the user.

10. The method of claim 9, wherein the search window is a pop-up window in which the user enters the at least part of a search keyword to search for call details.

11. The method of claim 6, wherein the step of displaying the call details comprises the steps of:
    if a number of the searched call details is at least one, sequentially arranging the searched call details in a predetermined order; and
    displaying the call details.

12. The method of claim 6, wherein the call details are stored in a form suitable for e-mail transmission.

* * * * *